United States Patent
Nishiyama et al.

(10) Patent No.: US 7,908,597 B2
(45) Date of Patent: Mar. 15, 2011

(54) METHOD FOR EXECUTING PLURAL PROGRAMS, METHOD FOR CONVERTING SOURCE PROGRAMS AND COMPILER PROGRAM USING THESE METHODS

(75) Inventors: Hiroyasu Nishiyama, Kawasaki (JP); Kei Nakajima, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 1442 days.

(21) Appl. No.: 11/290,475

(22) Filed: Dec. 1, 2005

(65) Prior Publication Data
US 2006/0143429 A1  Jun. 29, 2006

(30) Foreign Application Priority Data

Dec. 28, 2004  (JP) ................................. 2004-378765

(51) Int. Cl.
G06F 9/45 (2006.01)
G06F 9/44 (2006.01)
(52) U.S. Cl. ......................... 717/152; 718/102; 711/150
(58) Field of Classification Search ........................ None
See application file for complete search history.

(56) References Cited

U.S. PATENT DOCUMENTS 6,757,891 B1 * 6/2004 Azagury et al. ............... 717/158
2004/0162948 A1 * 8/2004 Tremblay et al. ............ 711/137

FOREIGN PATENT DOCUMENTS

JP  05-257792  10/1993

OTHER PUBLICATIONS

Transactional Monitors for Concurrent Objects Adam Welc, Suresh Jagannathan, and Antony L. Hosking ECOOP 2004, LNCS 3086, pp. 518-541.*
Language Support for Lightweight Transactions Tim Harris, Keir Fraser OOPSLA'03, Oct. 26-30, 2003, Anaheim, California.*
A Qualitative Survey of Modern Software Transactional Memory Systems Virendra J. Marathe and Michael L. Scott Department of Computer Science University of Rochester Jun. 2004.*
Lock Reservation: Java Locks Can Mostly Do Without Atomic Operations Kiyokuni Kawachiya, Akira Koseki, and Tamiya Onodera OOPSLA'02, Nov. 4-8, 2002, Seattle, Washington, USA.*
D. Bacon, et al. "Thin Locks: Featherweight Synchronization for Java", IBM T.J. Watson Research Center.
Jong-Deok Choi, et al. "Escape Analysis for Java" IBM T.J. Watson Research Center.

* cited by examiner

Primary Examiner — Emerson C Puente
Assistant Examiner — Paul Mills
(74) Attorney, Agent, or Firm — Antonelli, Terry, Stout & Kraus, LLP.

(57) ABSTRACT

A synchronous reference code indicative of the fact that synchronous updating was made is provided to data which is to be applied to a critical section, and the code is set when synchronous updating is made. After a sentence in the critical section is executed, it is confirmed whether or not the synchronous updating of the data was made. In a thread for synchronous reference, reference is made, it is confirmed whether or not synchronous updating was made, and then the correctness of the updating is confirmed. When the synchronous updating is not made, the execution of the critical section is completed. Thereby the simultaneous execution of the critical sections and reduction of an overhead are realized.

7 Claims, 13 Drawing Sheets

FIG.3A

```
class C {
    private int _x;
    synchronized int get() {
        return(_x);
    }
    synchronized void set(int x) {
        _x = x;
    }
    synchronized void twice(int n) {
        _x = _x +n;
        _x = _x +n;
    }
}
```

SOURCE CODE

FIG.3B - PRIOR ART

```
lock(this)          ~301
tmp = this->_x      ~302
unlock(this)        ~303
return(tmp)         ~304
```

'GET' PSEUDO CODE

FIG.4 - PRIOR ART
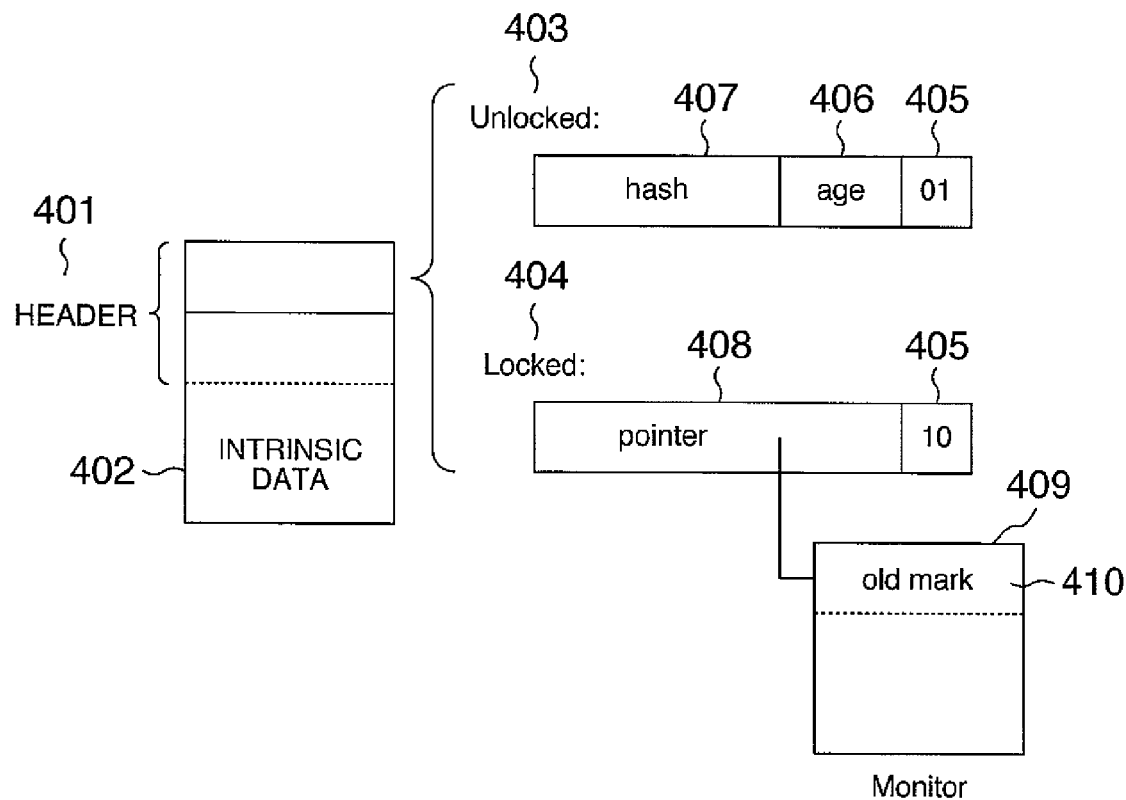
FIG.5
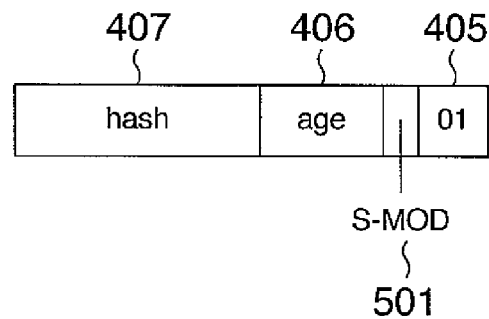

FIG.6

```
tmp = this->_x                   601
if((this->mark & 7) == 1) {      602
    return(tmp);                 603
}
lock(this)
tmp = this->_x                   604
unlock(this)
return(tmp)
```

FIG.7

```
lock(this)
this->monitor->old_mark |= 4     701
this->_x = this->_x +n
this->_x = this->_x +n
unlock(this)
```

FIG.8

```
lock(this)
this->_x = x
unlock(this)
```

CASE1

CASE2

CASE3

CASE1

CASE2

FIG.12

```
tmp = this->_x                              ~1201
id = (this->mark & mask) >> 2        ⎫
if(((this->mark & 3) ==1) &&          ⎪
    ((id == NoThread) ||              ⎬ 1202
      (id == ThisThread))) {          ⎪
   return(tmp);                       ⎪
}                                     ⎭
lock(this)                            ⎫
tmp = this->_x                        ⎬ 1203
unlock(this)                          ⎪
return(tmp)                           ⎭
```

FIG.13

```
lock(this)                                  ~1301
old_mark = this->monitor->old_mark
id = (old_mark & mask) >> 2
if((id == NoThread) || (id == ThisThread)) {  ⎫
    id = ThisThread                           ⎬ 1302
}                                             ⎭
else {                                        ⎫
    id = MultipleThreads                      ⎬ 1303
}                                             ⎭
this->monitor->old_mark = (old_mark & ~mask) | (id << 2)
this->_x = this->_x +n
this->_x = this->_x +n
unlock(this)
```

FLAG VERSION

THREAD ID VERSION

METHOD FOR EXECUTING PLURAL PROGRAMS, METHOD FOR CONVERTING SOURCE PROGRAMS AND COMPILER PROGRAM USING THESE METHODS

INCORPORATION BY REFERENCE

The present application claims priority from Japanese application P2004-378765 filed on Dec. 28, 2004, the content of which is hereby incorporated by reference into this application.

FIELD OF THE INVENTION

The present invention relates to exclusive control under which a plurality of programs are parallelly executed and more particularly, to a technique for increasing an exclusive accuracy for the exclusive control to reduce an overhead.

BACKGROUND OF THE INVENTION

It has been conventionally known that exclusive control is carried out on partial sections of programs to be parallelly executed for sequential execution.

Recent OS's or programming languages support a program executing function of operating a plurality of "threads" called "multi-thread" parallelly or pseudo-parallelly on a multi-processor based on time division. In this connection, the word "thread" refers to an execution entity sharing the memory space of a computer system.

Thread processing, which is different from conventional divided processing units, shares the memory space and other computer resources. Thus the thread processing is advantageous in that sharing of data between a plurality of threads can be facilitated with a low execution overhead.

For example, Java (registered trademark) as a sort of programming language supports the multi-thread at language level, improves program performance on a multi-processor system, and facilitates short and clear description of processing requiring simultaneous execution of a plurality of jobs in a network server, a GUI application or the like.

In a program supporting the multi-thread function, a plurality of threads are processed simultaneously and parallelly. Thus, when the plurality of threads are operated simultaneously and parallelly on the same object (data), this may cause possible inconsistency in the state of the object. To avoid this, Java prepares a synchronization function (exclusive control function) called "monitor" to enable exclusive control between the threads. The word "exclusive control" as used therein refers to such control as to cause only one thread to operate an object to avoid an disadvantage involved by a plurality of threads which operate the same object at the same timing.

The monitor, which has a data structure having data to be subjected to the exclusive control and an exclusive access procedure thereto as a set, is configured so that, when executing a critical section, only one thread at most can execute it. The word "critical section" as used therein refers to a section which is specified by the user and exclusively executed by the program.

To this end, each thread locks an object to be operated at the entrance of the critical section and unlocks the object at the exit of the critical section.

When the object to be locked is already locked by another thread, the execution thereof is awaited until the object is unlocked. In this manner, the exclusive execution of the program in the critical section can be carried out. A class library in Java is designed on the assumption that the class library is used in a multi-thread environment.

In many programs, meanwhile, it is experimentally known that most of objects generated upon execution are not referred to by a plurality of threads. The word "to refer" as used therein means that a system or a program acquires the content of an object while not changing the property of the object. In the implementation of a conventional virtual machine (which will be referred to merely VM, hereinafter), high speed processing is realized by considering the fact that a thread requiring such exclusive control is localized (locality).

For example, refer to a non-patent literature 1, D. Bacon and R. Konuru and C. Murthy and M. Serrano, Thin Locks: Featherweight Synchronization for Java, In Proceedings of the SIGPLAN Conference on Programming Language Design and Implementation, 1998. In the literature 1, a high-speed system called "Thin Locks" is proposed.

In the Thin Locks, while an object is locked by a single thread, the locking and unlocking of the object are carried out with a low overhead by writing information about the locking thread in a region reserved in a header of the object.

When a plurality of threads simultaneously require the execution of a critical section, the header of the object is changed to designate a data structure externally reserved for exclusive control.

When the plurality of threads require the execution of a critical section, the operation of the externally-reserved data structure is required. However, when the lock by only a single thread is carried out, the locking and unlocking thereof can be realized only through the operation of the header, thus realizing a high-speed exclusive processing.

As another system other than such an overhead reduction system for dynamic exclusive control, there is proposed an optimization system which removes unnecessary exclusive control by analyzing a program.

For example, refer to non-patent literature 2, J. D. Choi, Escape Analysis for Java, In Proceedings of the Conference on Object-Oriented Programming Systems, Languages, Applications, 1999. In the literature 2, there is proposed a system for removing unnecessary exclusive control by performing program analysis called "escape analysis".

The escape analysis is a technique for analyzing whether or not an object generated in a program can be shared by a plurality of threads. When the fact that the object cannot be shared by the plurality of threads is ensured through the analysis of the above technique, the exclusive control for the object becomes unnecessary and therefore this function can be eliminated.

The prior art exclusive high-speed technique is limited only to the situation where (1) exclusive control is required only by a single thread or (2) compiler ensures that exclusive control is unnecessary due to data not shared by a plurality of threads.

Accordingly, in situations other than the aforementioned situations, the execution of an instruction in a critical section is exclusively carried out even when data can, in practical case, be executed simultaneously, as when the data are merely referred to. In the critical section, even when the data are merely referred to by threads, the thread in question has to await its own order or sequence. That is, as a whole, the exclusive control is executed sequentially on the plurality of threads.

SUMMARY OF THE INVENTION

Information indicative of whether or not updating was carried out in a section to be exclusively executed or information for identifying a thread which carried out such updating, is provided to data to be subjected to exclusive control. The word "updating" as used therein refers to changing the content of an object by a system or a program. The words "updating in a section to be exclusively executed" and "referring to in a section to be exclusively executed" as used therein are abbreviated to "synchronous updating" and "synchronous reference", respectively.

When a critical section is started with threads to be possibly updated at the same timing, the aforementioned information is assumed to be set.

In threads to be referred at the same timing data is referred without exclusive control, and thereafter the information provided to the data is inspected.

When the updating of the data at the same timing is not carried out or when the one thread updates at the same timing, but no other thread updates, it is ensured that data previously referred to is not updated. Thus, the processing can be finished without performing exclusive control in the critical section.

When exclusive control is required for a critical section in the prior art, the present invention (1) can reduce an overhead for sequential execution of a program and (2) can reduce an overhead by the parallel execution of the program when the object is not updated yet.

BRIEF DESCRIPTION OF THE DRAWINGS

FIG. 3A shows a program to which the invention is applied;

FIG. 3B shows an example of a pseudo code of the program;

FIG. 4 shows an example of a structure of an object in the prior art;

FIG. 5 shows a structure of a mark field in an improved unlocked state;

FIG. 6 shows an example of a pseudo code of a 'get' method to which the optimization of synchronous reference is applied;

FIG. 7 shows an example of a pseudo code of a 'twice' method in synchronous updating;

FIG. 8 shows an example of a pseudo code of a synchronous updating method eliminating the need for setting synchronous reference information;

FIG. 12 shows an example of a pseudo code of a synchronous reference method of the extended thread ID version;

FIG. 13 shows an example of a pseudo code of a synchronous updating method ('twice' method) of an extended thread ID version;

DESCRIPTION OF THE EMBODIMENT

Figure 2:
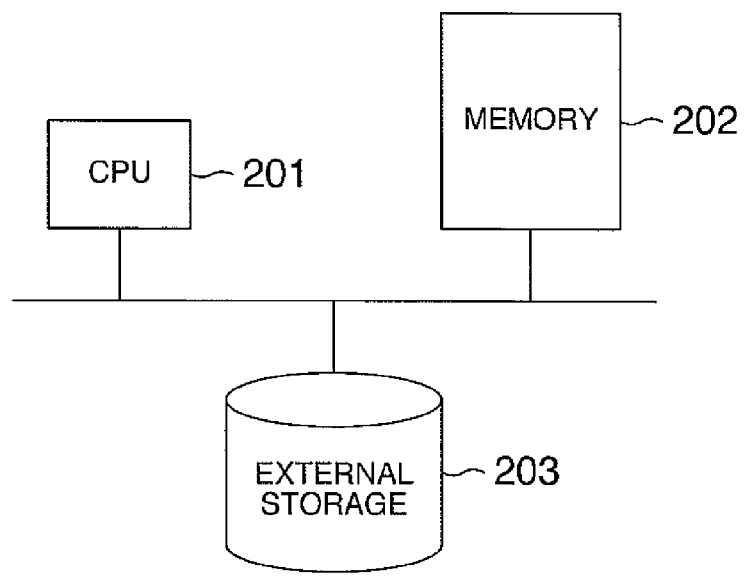
FIG. 2 shows an example of a system to which the present invention is applied.

FIG. 2 shows an example of a system to which the present invention is applied. A language processing system (which will be referred to as the compiler, hereinafter), to which the present invention is applied, is stored in an external storage 203 for distribution. Upon execution, the compiler is read out from the external storage 203 to a memory 202 to be executed by a CPU 201.

Figure 1:
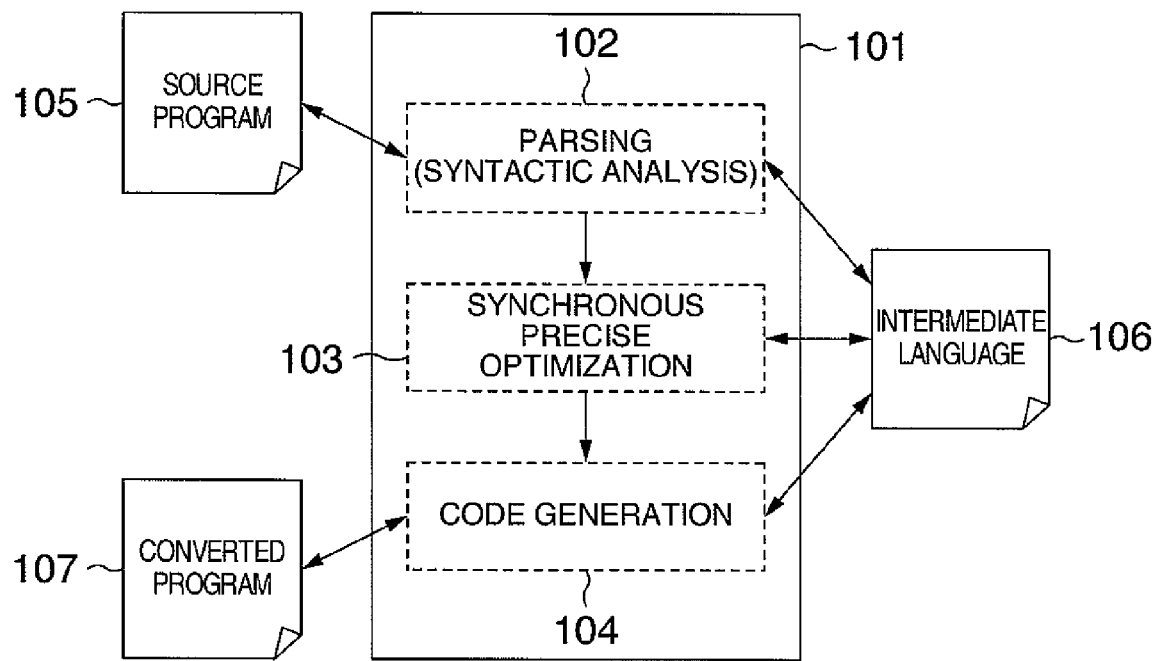
FIG. 1 shows an exemplary arrangement of a compiler to which the present invention is applied.

FIG. 1 shows an embodiment of the present invention. A compiler 101, to which the present invention is applied, inputs a source program 105 and outputs a converted or compiled program 107. The compiler 101 includes a parsing 102 (syntactic analysis), a synchronous precise optimization 103 and a code generation 104 forming a featured part of the present invention. These processes read and write an intermediate language 106 as an intermediate result.

FIGS. 3A and 3B show a program to which the present invention is applied, and an example of a pseudo code thereof. FIG. 3A shows an example of description of a synchronization method based on Java. In Java, an object belonging to a method having a 'synchronized' indicator provided thereto is exclusively executed as a critical section. For a class C, synchronization method 'get' for finding the value of a field_x, a synchronization method 'set' for setting the value of the field_x, and a synchronization method 'twice' for adding twice a value specified by a parameter to the field_x; are defined.

FIG. 3B shows a pseudo code when a prior art system is applied to the synchronization method 'get'. In the 'get' pseudo code shown in FIG. 3B, a target object is locked (301), field reference is carried out (302), the target object is unlocked (303), and then a referred field value is returned (304). Since only one thread can be executed during a period from the field lock to the field unlock, exclusive control is realized. In this program, 'this' is assumed to indicate the belonging object of the method.

FIG. 4 shows an example of a prior art structure of an object. The object has a fixed-length header 401 and an object intrinsic data 402 of a variable length. The state of an object and data associated therewith are stored in the first word (mark field) of the header. It is assumed in this example that the data structure of the object takes either an unlocked state 403 or a locked state 404. It is also assumed that the above states are identified by lower 2 bits of the mark field, that is, the state is identified as the unlocked state when the lower 2 bits is '01' in binary notation, whereas, the state is identified as the locked state when the lower 2 bits is '10'. In the case of the unlocked state, the mark field holds information about a hash value 407 of the object, an age 406 of the object, etc. In the case of the locked state, a pointer 408 to a data structure 409 expressing lock information externally reserved is stored in the mark field. In the data structure 409 expressing the lock information, a value 410 of the original mark field is saved.

In the example of the pseudo code of FIG. 3B, when a 'lock' operation is applied to an object having a mark field of the unlocked state, the object is converted from the unlocked state to the locked state. When an 'unlock' operation is applied to an object of the locked state, the state is converted from the locked state to the unlocked state. When a plurality of threads require the 'lock' operation, the threads waiting for the implementation of the critical section are stored in a wait queue reserved in the data structure 409 (in FIG. 4), so that, each time the execution of the critical section is completed, one of the stored threads is sequentially extracted from the wait queue and is then executed.

In this example, the object has two states, that is, the unlocked state and the locked state. However, the prior art technique as shown in the aforementioned non-patent literature 1 may be used for processing at a high speed when the object is locked only by a single thread.

In a first embodiment of the present invention, when a flag indicative of whether or not synchronous updating was carried out is attached to an object, an overhead in a critical section can be reduced and simultaneous execution can be realized.

FIG. 5 shows a structure of a mark field in an improved unlocked state. When compared with the mark field (FIG. 4) of the prior art unlocked state, the mark field is different therefrom in that a synchronous updating bit (S-MOD bit) 501 indicative of whether or not the object was synchronously updated is newly added to the mark field.

Explanation will next be made as to how to precisely optimize synchronous reference to execute a sequence of the synchronous reference at high speed under predetermined conditions using the synchronous reference bit.

The precise optimization of the synchronous reference is carried out to a method which makes only reference to in a critical section. A code generated after such optimization is provided with a function of executing an instruction in the critical section on a trial basis and thereafter referring to the synchronous updating bit of the object. Since object cannot be synchronously updated in case of a certain reference instruction, the synchronous updating bit means to be "effective" (no updating of the object) as a result of the above trial execution.

When conditions (to be explained later) are satisfied, the synchronous reference sequence in the critical section is optimized. When the trial execution of the critical section is not effective, that is, when the object is synchronously updated, the object is locked and then the instruction in the critical section is executed as in the prior art.

Since the instruction in the critical section is executed on a trial basis, the optimization of the synchronous reference sequence is carried out only when the conditions to be explained below are satisfied.

A. <Precise Optimization Executing Conditions in Synchronous Reference Sequence>

(1) Concerning instructions appearing in a critical section, the operation by other threads to updatable memory area should be only reference.

(2) Even when an instruction appearing in the critical section except for referring to memory in the condition (1), is executed this should not be accompanied with data transaction via the memory, synchronization or an interaction with the other threads, or I/O or an interaction with another program or VM.

FIG. 6 shows an example of a pseudo code of a 'get' method to which optimization is applied. In the pseudo code, field reference in a critical section is first executed (601), and then it is confirmed whether or not the value of lower 3 bits of the mark field of the object is "1" (602).

When the value of the lower 3 bits is "1", it is confirmed that the state is unlocked and a synchronous updating bit is not set (that is, synchronous updating is not carried out), so that the method is executed and completed (603). When the value of the lower 3 bits of the mark field is not "1", the object is locked and the critical section is executed (604) like a usual case.

When the synchronous updating bit is not set, a plurality of critical sections can be executed at the same time. Further, since the need for 'lock' and 'unlock' operations is eliminated, an overhead for synchronization can be reduced more largely than that in the prior art.

In the code to which the present invention is applied, so long as the synchronous updating bit is not set, references from a plurality of threads can be executed simultaneously and thus parallel processing performance can be increased. In the prior art (non-patent literature 1), since increasing the processing speed is achieved in only the case where object synchronization is carried out with a single thread, the performance can not be improved in case that the 'get' method of FIG. 3A is simultaneously executed with a plurality of threads.

FIG. 7 shows an example of a pseudo code of the 'twice' method. Since the 'twice' method is a method for synchronous updating, after the object is locked, then the S-MOD bit (third bit from the bottom) as the value of a mark field as a save destination is set (701). From now on, the object is treated as having synchronously updated.

As has been mentioned above, in the synchronous updating case, since the fact that updating was made is identified by another thread, the synchronous updating bit is changed to "1" when the object is locked. With respect to the object having the synchronous updating bit of "1", since a fast pass in the pseudo code of the optimization-applied version shown in FIG. 6 cannot be applied, an overhead during execution is slightly increased. By eliminating the case of changing the synchronous updating bit to "1", the overhead can be reduced.

In order to reduce a frequency of setting the synchronous updating bit of the object, the number of memory referring operations in the precise optimization executing condition (1) in the synchronous reference sequence is limited to "1". Thus, even if update is performed in the critical section by a thread carrying the synchronous updating, the satisfaction of the following conditions in the critical section can omit setting of the synchronous updating bit in the synchronous updating thread.

B. <Conditions of a Frequency of setting Synchronous Updating Bit>

(1) The number of memory updating times in a critical section observable from another thread should be "1" at the highest.

(2) The execution of the critical section should not be accompanied with an interaction with another thread, synchronization, I/O or an interaction of other detectable program different from VM, except for the updating of the state of the condition (1).

(3) The execution of the critical section should be completed within predetermined steps.

Due to the conditions (1) and (2), it is ensured that a value detectable from the referring thread can take a value before the execution of the critical section or a value after the execution of the critical section. Due to the condition (3), it is also ensured that the need for the referring thread to wait for the completion of execution of the critical section to be updated can be eliminated. Based on the intended definition of a critical section, a thread for executing another critical section has to execute the critical section after the completion of execution of the critical section being executed.

Meanwhile, when a thread is executing a critical section to which the reduction of the synchronous updating bit was applied, the synchronous reference sequence subjected to optimization application can be executed simultaneously with the critical section being executed. If a case, where the execution of a critical section is not completed within a predetermined step, is allowed as an application case; then, even in such a case as to make an endless loop within the critical section in an updating thread, the referring thread can continue the execution after the critical section using a value after updated, as a result of which the program is incorrectly operated. The condition (3) is provided to exclude such a case.

In the example of FIG. 3A, a 'set' method conforms to the aforementioned application condition of reduction of the synchronous updating bit. An example of the pseudo code satisfying the above condition is shown in FIG. 8. In the pseudo code of the 'set' method, similarly to the prior art code, a code for setting the synchronous updating bit is not generated.

Figure 9A:
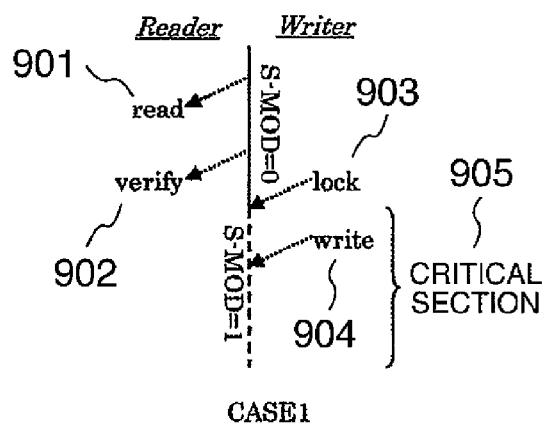
FIG. 9A is a case 1 for discussing the safety of an improved synchronization technique to which optimization is applied.
Figure 9B:
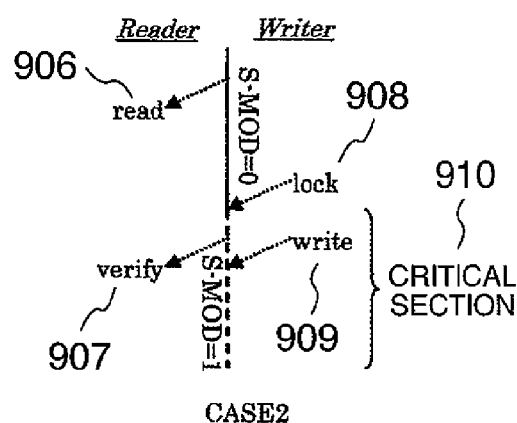
FIG. 9B is a case 2 for discussing the safety of the improved synchronization technique to which optimization is applied.
Figure 9C:
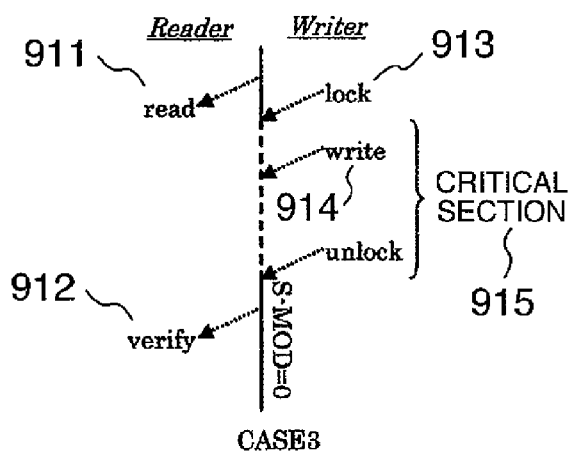
FIG. 9C is a case 3 for discussing the safety of the improved synchronization technique to which optimization is applied.

In FIGS. 9A, 9B, and 9C, explanation will be made as to the safety of a proposed synchronization improving technique. FIG. 9A shows a case when a modification of a mark field at a start point 903 of a critical section 905 of an update thread is made later than a reference 902 of a mark field in the reference thread.

In this case, since the writing 903 to the object is not present earlier than the reading 902 of the mark field in the reference thread, the value of a filed reference 901 done earlier than the mark field reference 902 of the reference thread can be regarded as correct.

FIG. 9B shows a case when the updating of a mark field at a start point 908 of a critical section 910 in a synchronous updating thread is earlier than a mark field reference 907 by the reference thread. In this case, the object is recognized as having a locked state, or S-MOD=1, that is, the object is recognized as having synchronously updated. Therefore, the field value read out by the reference thread at a point 906 is discarded, the execution of the critical section by usual synchronization is carried out, and the value written at a point 909 by the updating thread is referred to.

FIG. 9C shows a case when the number of synchronous reference points and the number of synchronous updating points are limited respectively to only 1. In this case, a definition point in a critical section 915 of an updating thread is only a single write point 914. Thus, it is ensured that a value obtained at a read point 911 by the referring thread is a value before the thread enters the critical section or a value after the thread exits the critical section. For this reason, even when the synchronous updating bit is not set at a start point 913 of the critical section on the updating thread side, it is ensured that a mark field reference 912 of the reference thread will not become incorrect.

Figure 10A:
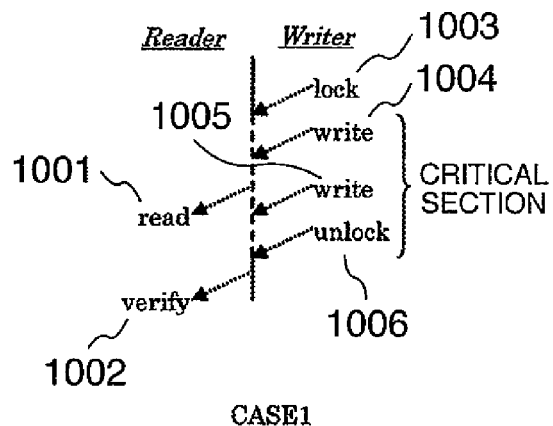
FIG. 10A is a case 1 for explaining an example of operation of a program when the optimization is not applied.

FIG. 10A is a case when synchronous updating in a critical section of an updating thread occurs twice (at points 1004 and 1005) or more, showing a situation generated when correctness inspection based on the synchronous updating bit is not carried out or when the synchronous updating bit is cleared after the synchronous updating.

FIG. 10A shows an incorrect situation in this case, precise optimization of synchronization code is not executed in the present invention. In the example of FIG. 10A, field definition appears twice in a critical section having a locking operation 1003 and an unlocking operation 1006. However, a value to be detected by another thread have to be a value not updated before a thread enters the critical section or a value as a result of the second-time updating (at a point 1005) done after the thread exits the critical section.

In the illustrated example, however, a result based on the first updating 1004 is read out at a point 1001. Thus, if the synchronous updating bit is not correctly considered at a mark field read point 1002, then an incorrect result is obtained. In the optimization of the present invention, since the synchronous updating bit is set at a reference point and in an updating critical section, such a situation as mentioned above will not take place.

Figure 10B:
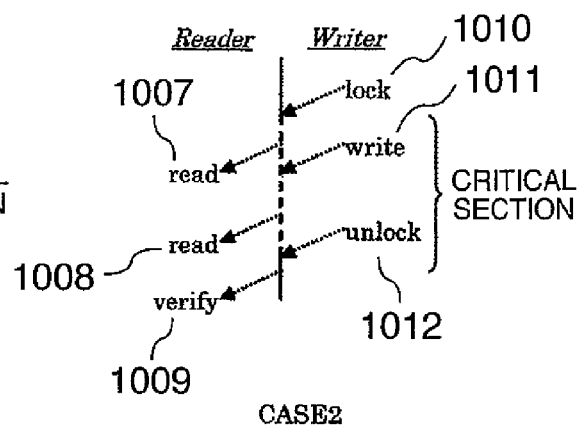
FIG. 10B is a case 2 for explaining an example of operation of a program when the optimization is not applied.

FIG. 10B shows a case when the reducing operation of critical-section synchronous updating bits is applied in a referring thread and when a plurality of memory references are made in a reference critical section. FIG. 10B shows an incorrect situation, which is not treated as an application case of synchronous code optimization in the present invention. In the example of FIG. 10B, since the synchronous updating bit is not changed in the critical section having a locking operation 1010 and an unlocking operation 1012, the referring thread and the updating thread can be executed at the same time. In the referring thread, memory reference is made several times (at points 1007 and 1008). Accordingly, when the updating thread refers to values before and after updating of the value updated in the critical section and when it is decided through verification at a point 1002 that the execution of the critical section is correct, a inconsistency result may be derived. When the number of memory references in the critical section being referred to is set at 1 at the highest as mentioned above, such a inconsistency result can be avoided.

In a system utilizing the aforementioned synchronous updating bit, if a synchronously-updatable critical section is even once executed even for the same thread, then the precise optimization effect for subsequent reference critical sections is reduced. When a thread for executing a critical section to be synchronously updated is the same as a thread for executing a critical section to be synchronously referred to, however, such a situation that the two critical sections are simultaneously executed will not occur and thus a fast pass having the synchronous reference/optimization applied thereto can be executed. A method for improving such a case will be explained.

Figure 11:
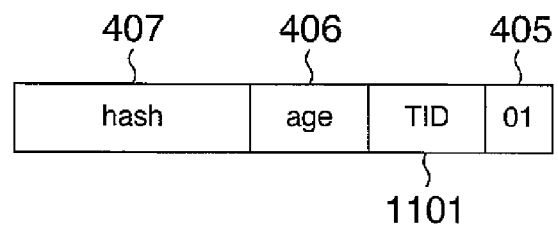
FIG. 11 shows an example of a structure of a mark field of an extended thread ID version.

FIG. 11 shows a structure of an extended mark field. In this case, in place of the synchronous updating (S-MOD) bit of FIG. 5, a thread ID (TID) field for identifying the thread which has executed synchronous updating is added. An initial value for the thread ID field is NoThread which indicates no relevant thread, and when a thread carries synchronous updating, an identifier for the thread is stored. When a plurality of threads carry synchronous updating, identifiers (MultipleThreads) indicative of the plural-thread updating is stored.

An example of a pseudo code to which the extension of the invention is applied for the 'get' method of FIG. 3A, is shown in FIG. 12.

In this pseudo code, a sentence in a critical section is first executed on a trial basis (refer to 1201 in FIG. 12), and, when an object is not synchronously executed or when a synchronously-updated object is the object itself, the processing is finished as it is (refer to 1202 in FIG. 12). When synchronous updating is carried out by another thread, like the usual execution of a critical section, the object is locked, the critical section is executed, and then the locked object is unlocked as a procedure (refer to 1203 in FIG. 12).

Next, an example of a pseudo code of the 'twice' method of FIG. 3A is shown in FIG. 13. In the pseudo code of FIG. 13, an object is locked for synchronous updating (refer to 1301 in FIG. 13). Thereafter, when a target object is not synchronously updated or is synchronously updated by itself, a thread ID (TID) field is set in its own thread identifier (refer to 1302 in FIG. 13). In the other cases, an identifier (MultipleThreads) indicative of updating by a plurality of threads is set (refer to 1303 in FIG. 13).

Figure 14A:
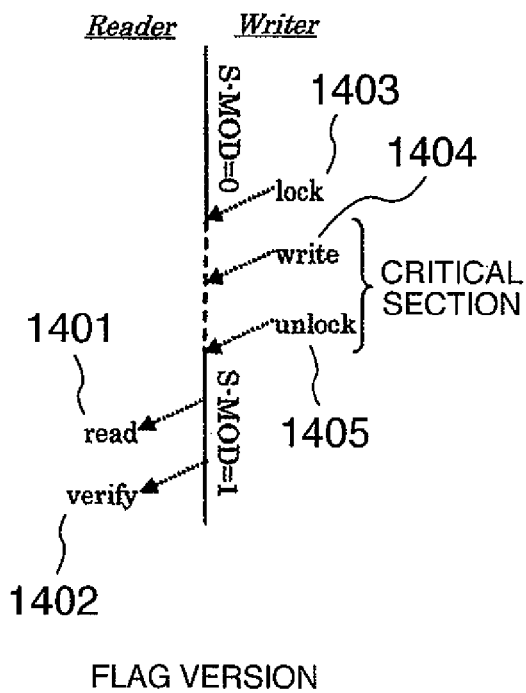
FIG. 14A is a diagram for explaining how a flag version program utilizing a synchronous updating (S-MOD) bit is operated.
Figure 14B:
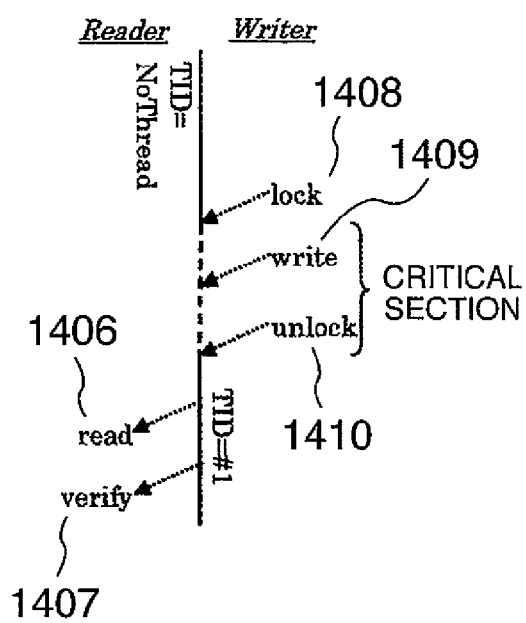
FIG. 14B is a diagram for explaining how a thread ID version program utilizing a thread identifier (Tm) is operated.

FIG. 14A shows a manner that a flag version utilizing a synchronous updating (S-MOD) bit is operated. FIG. 14B shows a manner that a thread ID version utilizing a thread identifier (TID) is operated. In those cases, it is assumed that a thread executing synchronous updating is the same as a thread executing synchronous reference. In the flag version, the synchronous updating (S-MOD) bit is set by executing the critical section having a lock 1403 and an unlock 1405. For this reason, in spite of the fact that it can be ensured that a write 1404 of shared data and a read 1401 thereof are carried out in this order in the same thread, a verify at a point 1402 ends in failure and usual synchronizing operation is undesirably executed.

In the thread ID version, a thread identifier (TID) is set for the thread executing synchronous updating (#1 in this example) by executing a critical section having a lock 1408 and an unlock 1410. When the thread executing synchronous reference to at a point 1406 is the same thread executing synchronous updating to at a point 1409, verification ends in success at a point 1407, and data written at the synchronous updating 1409 can be used as the value read out at the synchronous reference 1406. Therefore, the need for locking and unlocking the object can be eliminated and synchronous reference can be realized with a low overhead.

Figure 15:
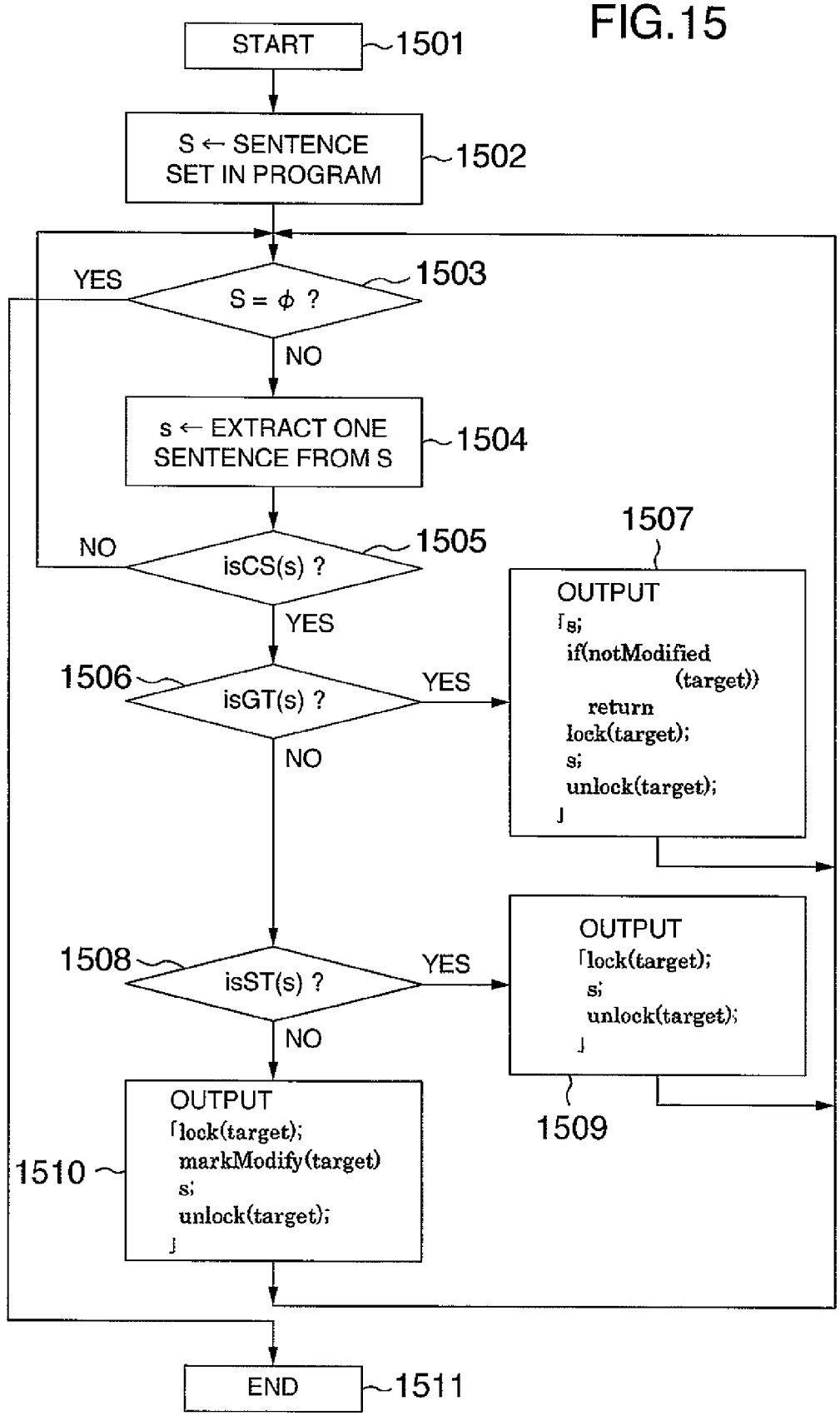
FIG. 15 is a flow chart for explaining a synchronous optimizing process.

FIG. 15 shows a flow chart of a synchronous precise optimization process as a feature of the present invention. The synchronous precise optimization process starts with a step 1501. At a next step 1502, a sentence set in the program is found and the set is stored in a variable S. At a step 1503, next, it is confirmed at a step 1503 whether or not the set S is an empty set. When the set is an empty set, this means that there is no sentence to be processed, thus the program shifts control to a step 1511 to complete the optimization process. If the set S is not an empty set, then the program extracts one sentence from the set S and stores it in a variable s at a step 1504.

At a next decision step 1505, the program decides whether or not the sentence s is a critical section (assuming that, when is CS(s) is true, the sentence s is a critical section). Whether or not a sentence is a critical section is determined by the specifications of a programming language or the like. If the sentence s is not a critical section in the decision step 1505, then the program shifts control to the step 1503 to process the next sentence. When the sentence s is a critical section, the program confirms at a step 1506 whether or not the critical section s is to be subjected to the synchronous optimization (assuming that, when is GT(s) is true, the synchronous optimization is determined to be applied to the sentence s).

When the sentence is determined to be subjected to the synchronous optimization, the program shifts control to a step 1507, outputs a synchronous reference code subjected to the optimization. Thereafter, the program shifts control to the step 1503 to process the next sentence. When the sentence s is determined not to be subjected to the synchronous optimization, the program shifts control to a step 1508, and confirms whether or not the sentence s is a critical section requiring setting of synchronous updating information (synchronous updating bit or synchronous updating thread ID) (assuming that, when is ST(s) is true, the sentence s is determined to require setting of the synchronous updating information).

When it is determined that the setting of the synchronous reference information is not be required, the program generates at a step 1509 a critical section realizing code without the setting of the synchronous reference information. When the setting of the synchronous reference information is determined to be required, the program generates at a step 1510 a critical section realizing code with the setting of the synchronous reference information. After generating the code, the program shifts control to the step 1503 for the next processing.

Figure 16:
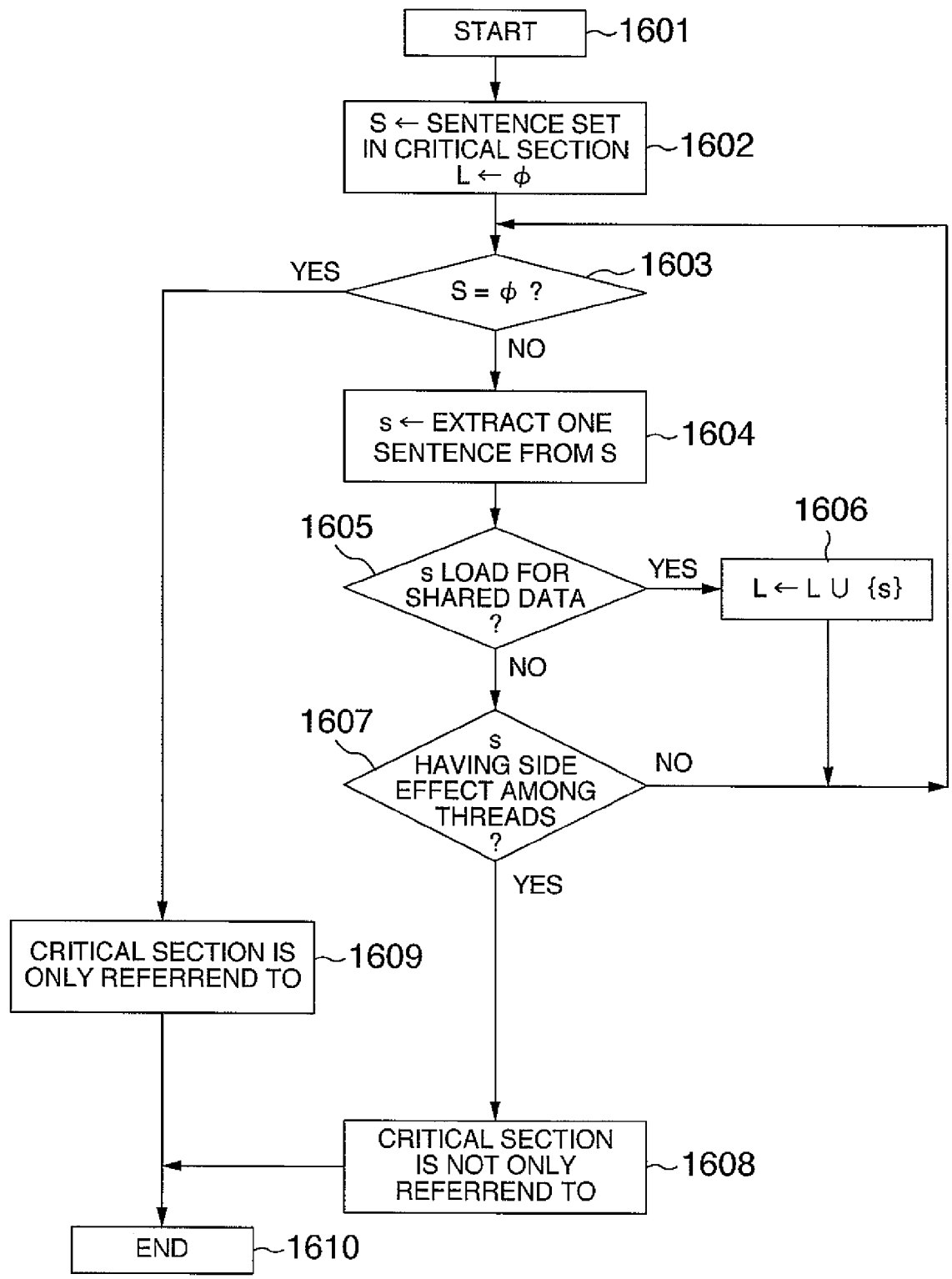
FIG. 16 is a flow chart for explaining a process of deciding whether or not synchronous optimization is applied in a step 1506 in FIG. 15.

FIG. 16 shows a flow chart of a process of determining whether or not the sentence is subjected to the synchronous optimization in the step 1506 of FIG. 15. The process of FIG. 16 starts with a step 1601. The program shifts control to a step 1602 to find a sentence set in the critical section to be decided and store the set in variable S. The program also initialize a variable L for storage a set of load instructions to a shared data in the critical section, to an empty set.

Next, the program decides at a step 1603 whether or not the set S is an empty set. If the set is an empty set, then the program shifts control to a step 1609. In the step 1609, it is determined that the critical section is to be only referred to and the critical section is to be subjected to the synchronous precise optimization, the program shifts control to a step 1610 to complete this procedure. When the number of load instructions in the critical section to be subjected to the synchronous optimization is limited to 1 at the highest, the program is only required to confirm whether the size of the set L is 1 or smaller. When the set S is not an empty set in the decision step 1603, the program shifts control to a step 1604 to extract one sentence from the set S and store it in the variable s.

Next, the program confirms at a step 1605 whether or not the sentence s is a load instruction to shared data. When the sentence is a load instruction to the shared data, the program adds the sentence s to the set L at a step 1606, shifts control to the step 1603 to process the next sentence. When the sentence s is not a load instruction to the shared data in the decision step 1605, the program decides at a step 1607 whether or not the sentence s is an instruction having detectable side effect between threads.

When the instruction has side effect, the critical section is determined not to be subjected to the precise optimization. Thus, the program shifts control to a step 1608, determines that the critical section does not have only referring threads, and completes the process at the step 1610. When the sentence s has no side effect at the decision step 1607, the program returns to the step 1603 to process the next sentence.

Figure 17:
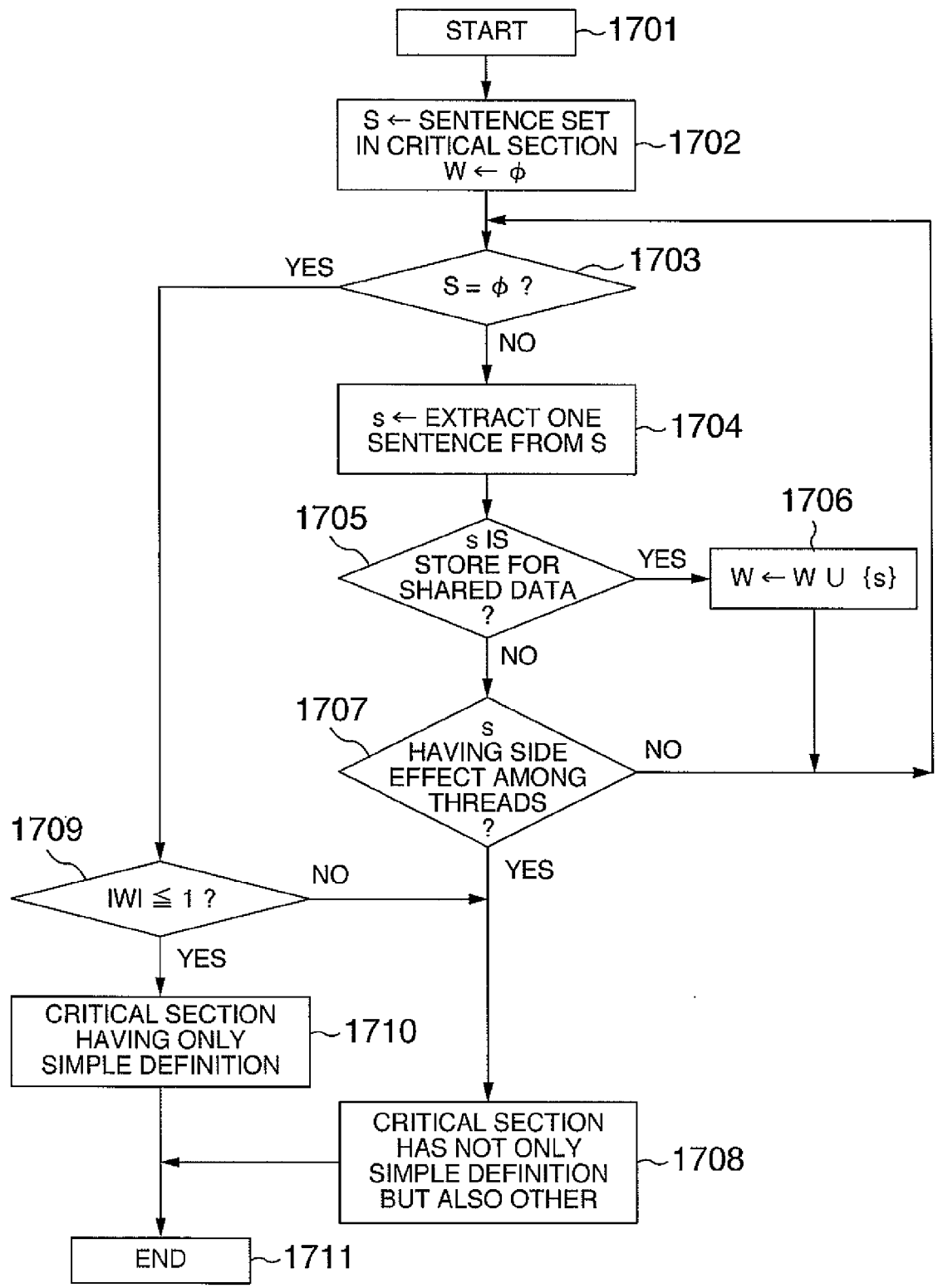
FIG. 17 is a flow chart for explaining a process of deciding whether or not a critical section in a decision step 1508 in FIG. 15 requires updating of synchronous reference information.

FIG. 17 shows a process of deciding whether or not the critical section in the decision step 1508 of FIG. 15 requires updating of the synchronous reference information. The decision process of FIG. 17 starts with a step 1701. The program finds at a step 1702 a sentence set in the critical section and stores the set in a variable S, and initializes a set W of store instructions to shared data in the critical section, to an empty set. Subsequently, the program confirms at a step 1703 whether or not the sentence set S is an empty set. When the sentence set S is an empty set, there is no sentence to be processed. Accordingly, the program confirms at a step 1709 whether the size of the store instruction set W to the shared data in the critical section is 1 or smaller, that is, that the number of store instructions to the shared data is only 1 at the highest. When the number of store instructions is only 1 at the highest, the program shifts control to a step 1710 to determine the critical section as having only a single definition and requiring no updating of the synchronous reference information and then completes this process at a step 1711.

When the number of store instructions is not only 1 at the highest in the step 1709, the program determines at a step 1708 that the critical section requires updating of the synchronous reference information, and completes this process at the step 1711. Returning to the step 1703, when the sentence set S is not an empty set, the program shifts control to a step 1704 to extract one sentence from the sentence set S and to store it in the variable s. The program next decides at a step 1705 whether or not the sentence s is a store instruction to shared data. When the sentence is a store instruction to the shared data, the program adds the sentence s to the set W at a step 1706. The program then shifts control to the step 1703 to process the next sentence. When the sentence s is not a store instruction to the shared data in the decision step 1705, the program confirms at a step 1707 whether or not the sentence is an instruction having side effect detectable between threads.

When the sentence has side effect, the program determines at the step 1708 that the critical section requires updating of the synchronous reference information, and completes this process at the step 1711. When the sentence has no side effect at the step 1707, the program shifts control to the step 1703 to process the next sentence.

In the code generated by the process shown in FIG. 15, setting of the synchronous reference information is only made and no clearing operation is done. For this reason, as the execution of the program advances, the number of objects to be subjected to the synchronous reference/optimization is decremented. To avoid this, a clear procedure of periodically clearing the synchronous reference information is introduced.

Figure 18:
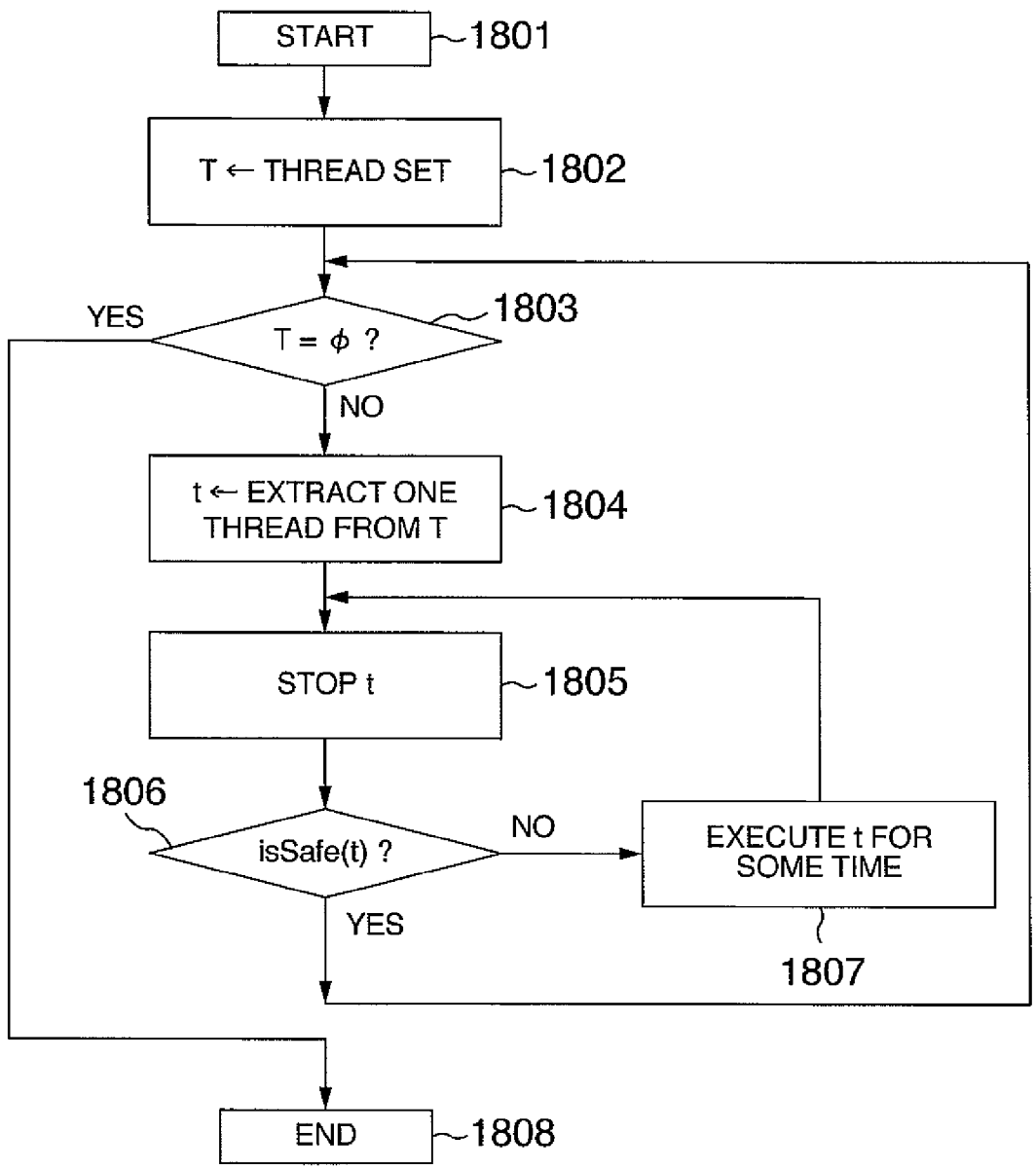
FIG. 18 is a flow chart for explaining a thread stopping process of clearing the synchronous reference information.
Figure 19:
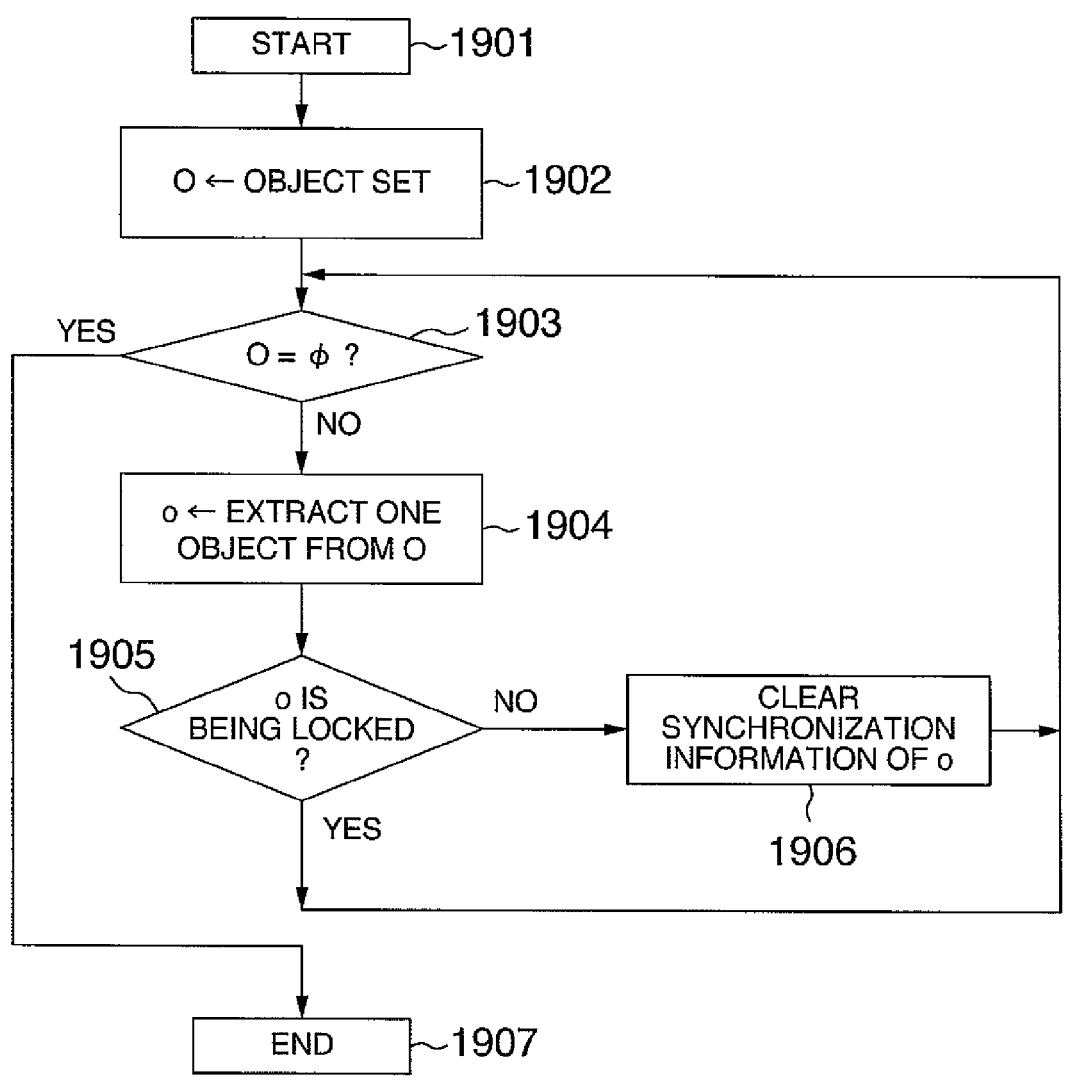
FIG. 19 is a flow chart for explaining a process of clearing synchronous updating information of an object.

FIGS. 18 and 19 show flow charts for explaining the above clear process. The clear process is carried out with all threads stopped. FIG. 18 shows a flow chart of the threads stopping process. The threads stopping process starts with a step 1801. At a step 1802, the program finds a set of threads in the program and stores the set in a variable T. The program then confirms at a decision step 1803 whether or not the thread set T is an empty set. When the thread set is an empty set, the program shifts control to a step 1808 and completes this process. When the thread set T is not an empty set, the program extracts at a step 1804 one thread from the set T and stores it in a variable t.

Subsequently, the program stops at a step 1805 a thread t and confirms at a step 1806 whether or not a stop point in the thread t is a safe stop point. It is assumed in this example that when is Safe(t) is true, this means that the thread t is stopped at the safe stop point. The word "safe stop point" as used therein means a program execution point except for a section line extended from the start point of a critical section subjected to the synchronous reference/optimization to the completion of confirmation of correctness of the precise optimization application in the critical section.

When the synchronization information is cleared at an unsafe stop point, a result of the confirmation of correctness of the synchronous optimization becomes incorrect. Thus it becomes necessary to perform the clear process at a safe stop point. When the stop point of the thread t is not a safe stop point in the decision of the step 1806, the program shifts control to a step 1807 to continue the execution of the thread t for some time and to continue the operations of the step 1805 and subsequent steps. When the stop point of the thread t is determined to be a safe stop point in the decision step 1806, the program shifts control to the step 1803 to process the next thread. Through the aforementioned operations, it is ensured that all the threads can be stopped at such a point that the synchronous reference information can be safely cleared.

FIG. 19 shows a flow chart of a clear process of clearing synchronous updating information on an object. The clear process starts with a step 1901. The program stores a set of objects in a variable o at a step 1902. The program next confirms at a step 1903 whether or not the set o is an empty set. When the set o is an empty set, the program shifts control to a step 1907 to complete this process. If the set is not an empty set, then the program extracts one object from the set o and stores it in the variable at a step 1904. Next, the program confirms at a decision step 1905 whether or not an object o is being locked. When the object is being locked, the program shifts control to the step 1903 to process the next object. When the object is not being locked, the program shifts control to a step 1906 to clear the synchronous updating information about the object o. Then the program shifts control to the step 1903 to process the next object.

The present invention can be applied to improve the performance of a program based on synchronous exclusive control.

Having described a preferred embodiment of the invention with reference to the accompanying drawings, it is to be understood that the invention is not limited to the embodiments and that various changes and modifications could be effected therein by one skilled in the art without departing from the spirit or scope of the invention as defined in the appended claims.

The invention claimed is:

1. A method for executing a plurality of threads in a computer system having a function of parallelly executing a plurality of threads, a memory space sharable by the plurality of threads, and a function of allowing or excluding execution of one thread of the plurality of threads attempting execution with respect to the memory space associated with sharing; said method comprising:

providing an area indicating that a data structure in said memory space to be referred to by said one thread was updated or not updated by threads other than the one thread, wherein said area is set at a start point of a section for exclusive execution of the plurality of threads, said section including one or more operations to said data structure;

attempting, by said one thread, a first reference in said section to said data structure and a second reference to a content of said area;

completing the first reference if the second reference to the content of said area indicates said data structure is not updated and the following conditions are satisfied:
  (a) the one or more operations to said data structure in said section by the other threads are only by reference and are limited to one, and
  (b) said section does not involve updating of data being referable from the other threads or input/output processing and interaction detectable between threads or programs of the computer system, except for the reference to the data structure of condition (a), and excluding execution of said one thread if the second reference to the content of said area indicates said data structure is updated or either of the conditions (a) or (b) are not satisfied;

wherein said one thread sets the content of said area to indicate said data structure was updated if said one thread updates said data structure, unless the following conditions are satisfied:
  (1) the number of updates to said data structure performed by said one thread in said section is one,
  (2) said section does not involve updating of data being referable from the other threads or input/output processing and interaction detectable between threads or programs of the computer system, except for the updating of the data structure of condition (1), and
  (3) execution of said one thread in said section is completed within a predetermined set of steps;

wherein the content of the area indicating that the data structure in said memory space to be referred to by said one program is updated is not returned to a previous content upon completion of updating.

2. A program converting method in a computer system having a function of parallelly executing a plurality of threads, a memory space sharable by the plurality of threads and a function of allowing or excluding execution of one thread of the plurality of threads attempting execution with respect to the memory space associated with sharing; said method comprising:

identifying presence or absence of a data structure shared by the plurality of threads in a source program described by a programming language having a function of parallelly executing the plurality of threads; and converting the source program to a converted program having an area indicative of the fact that the data structure was updated provided therein if the source program has the data structure shared by the plurality of threads wherein the area indicative of the fact that the data structure was updated is set at a start point of a section for exclusive execution of the plurality of threads, the section including one or more operations to said data structure;

wherein when said one thread attempts a first reference to the shared data structure in said section, it first makes a second reference to a content of the area indicative of the updated fact, wherein the one thread is allowed to complete the first reference if the content of the area indicates no updated fact based on the second reference and the following conditions are satisfied:

(a) the one or more operations to said data structure in said section by threads other than the one thread are only by reference and are limited to one, and (b) said section does not involve updating of data being referable from the other threads or input/output processing and interaction detectable between threads or programs of the computer system, except for the reference to the data structure of condition (a), and the one thread is excluded from executing said section if the content of the area indicates the updated fact based on the second reference or either of the conditions (a) or (b) are not satisfied;

wherein the one thread sets the content of the area as indicating the fact the data structure was updated if the one thread updates the data structure, unless the following conditions are satisfied:

(1) the number of updates to said data structure performed by the one thread in said section is one, (2) said section does not involve updating of data being referable from the other threads or input/output processing and interaction detectable between threads or programs of the computer system, except for the updating of the data structure of condition (1), and (3) execution of the one thread in said section is completed within a predetermined set of steps;

wherein the content of the area indicative of the fact that the data structure was updated is not returned to a previous content upon completion of updating.

3. A program converting method according to claim 2, wherein the area indicative of the fact that said data structure was updated is a field, and the source program is converted to the converted program having an identifier for said one thread as its content.

4. A program converting method according to claim 2, wherein the source program is converted to the converted program so that execution of the plurality of programs can be stopped when all of the threads of the plurality of threads are outside the section for exclusive execution of the plurality of threads and the content of the area indicative of the fact that the data structure was updated is changed to indicate that the data structure was not updated while the plurality of threads are stopped.

5. A compiler program for inputting a source program and outputting a converted program, wherein said compiler program has a syntactic analysis function, a synchronous precise optimization function and a code generating function, and said synchronous precise optimization function uses the program converting method set forth in claim 2.

6. A compiler program for inputting a source program and outputting a converted program, wherein said compiler program has a syntactic analysis function, a synchronous precise optimization function and a code generating function, and said synchronous precise optimization function uses the program converting method set forth in claim 4.

7. A compiler program for inputting a source program and outputting a converted program, wherein said compiler program has a syntactic analysis function, a synchronous precise optimization function and a code generating function, and said synchronous precise optimization function uses the program converting method set forth in claim 3.

* * * * *